(12) United States Patent
Saito (10) Patent No.: US 11,362,352 B2
(45) Date of Patent: Jun. 14, 2022

(54) FUEL CELL SYSTEM AND CONTROL METHOD OF FUEL CELL SYSTEM

(71) Applicant: Toyota Jidosha Kabushiki Kaisha, Toyota (JP)

(72) Inventor: Hiromu Saito, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 354 days.

(21) Appl. No.: 16/223,701

(22) Filed: Dec. 18, 2018

(65) Prior Publication Data
US 2019/0198899 A1  Jun. 27, 2019

(30) Foreign Application Priority Data
Dec. 25, 2017  (JP) .............................. JP2017-247795

(51) Int. Cl.
*H01M 16/00*       (2006.01)
*H01M 10/42*       (2006.01)
*H01M 8/04537*     (2016.01)

(52) U.S. Cl.
CPC ..... *H01M 8/04544* (2013.01); *H01M 16/006* (2013.01); *H01M 2010/4278* (2013.01); *H01M 2250/20* (2013.01)

(58) Field of Classification Search
CPC ........... H01M 8/04544; H01M 16/006; H01M 2010/4278; H01M 2250/20; H01M 8/04552; H01M 8/04559; H01M 8/04567; H01M 8/04753; H01M 8/04302; H01M 8/04992

USPC ............................................................ 429/7
See application file for complete search history.

(56) References Cited

U.S. PATENT DOCUMENTS

| 4,477,761 A * | 10/1984 | Wolf .................... H02P 27/047 318/800 |
| 4,686,617 A * | 8/1987 | Colton .............. H02M 3/33523 361/93.9 |
| 10,166,884 B2 * | 1/2019 | Matsumoto ......... B60L 11/1887 |
| 2006/0286418 A1 | 12/2006 | Saeki et al. |
| 2016/0156084 A1 * | 6/2016 | Kim .................. H01M 8/04559 429/9 |
| 2016/0335815 A1 * | 11/2016 | Ryu ....................... B60L 50/72 |
| 2017/0214070 A1 * | 7/2017 | Wang ................ H01M 8/04865 |
| 2019/0337403 A1 * | 11/2019 | Tanaka ............. H01M 8/04597 |

FOREIGN PATENT DOCUMENTS

| CN | 105655981 A | 6/2016 |
| CN | 107978776 A * | 5/2018 |
| JP | 2006-351408 A | 12/2006 |

(Continued)

*Primary Examiner* — Golam Mowla
(74) *Attorney, Agent, or Firm* — Dinsmore & Shohl LLP (57) ABSTRACT

Provided is a fuel cell system including: a fuel cell that supplies electricity to a load; a fuel cell converter that is connected between the fuel cell and the load and boosts a voltage output from the fuel cell; and a control unit that causes the fuel cell converter to perform a voltage boosting action and controls output electricity to the load. Upon detecting a voltage boosting disabling failure that is a failure in which the fuel cell converter is unable to perform the voltage boosting action and able to pass a current, the control unit stops the voltage boosting action of the fuel cell converter and passes a current through the fuel cell converter.

5 Claims, 2 Drawing Sheets

(56) References Cited

FOREIGN PATENT DOCUMENTS

| | | |
|---|---|---|
| JP | 2011-228294 A | 11/2011 |
| JP | 2013-110793 A | 6/2013 |
| JP | 2013-169076 A | 8/2013 |
| JP | 2014-125053 A | 7/2014 |
| JP | 2017-139150 A | 8/2017 |

\* cited by examiner

FIG. 1

FUEL CELL SYSTEM AND CONTROL METHOD OF FUEL CELL SYSTEM

CROSS-REFERENCE TO RELATED APPLICATIONS

This application claims priority to Japanese Patent Application No. 2017-247795 filed on Dec. 25, 2017, which is incorporated herein by reference in its entirety including the specification, drawings and abstract.

BACKGROUND

1. Technical Field

The present disclosure relates to a fuel cell system and a control method of the fuel cell system.

2. Description of Related Art

In fuel cell systems, a fuel cell converter disposed between a fuel cell and a load may be shut off upon failure of the fuel cell converter from the viewpoint of fail-safety. Japanese Patent Application Publication No. 2011-228294 describes a fuel cell system in which, upon failure of a fuel cell converter, the fuel cell converter is shut off and electricity is supplied from a secondary battery to a drive motor that is a load of a fuel cell electric vehicle.

SUMMARY

A fuel cell system configured to supply electricity only from a secondary battery to a load, such as a drive motor, when a fuel cell converter has failed during travel of the fuel cell electric vehicle is disadvantageous in that the distance the vehicle can travel is extremely short. Therefore, a technique has been sought that can prevent the distance the vehicle can travel from shortening upon failure of a fuel cell converter.

(1) A first aspect of the present disclosure relates to a fuel cell system including: a fuel cell that supplies electricity to a load; a fuel cell converter that is connected between the fuel cell and the load and boosts a voltage output from the fuel cell; and a control unit that causes the fuel cell converter to perform a voltage boosting action and controls output electricity to the load. Upon detecting a voltage boosting-disabling failure that is a failure in which the fuel cell converter is unable to perform the voltage boosting action and able to pass a current, the control unit stops the voltage boosting action of the fuel cell converter and passes a current generated by the fuel cell through the fuel cell converter. In the fuel cell system of this aspect, when the voltage boosting-disabling failure in which the fuel cell converter is unable to perform the voltage boosting action and able to pass a current is detected, the voltage boosting action of the fuel cell converter is stopped and a current is passed through the fuel cell converter. Thus, electricity can be continuously supplied from the fuel cell to the load. Therefore, shortening of the distance the fuel cell electric vehicle can travel can be prevented compared with if electricity is supplied only from the secondary battery.

(2) The above fuel cell system may further include: a secondary battery that supplies electricity to the load; a secondary battery converter that is connected between the secondary battery and the load, has an output terminal electrically connected to an output terminal of the fuel cell converter, and converts an output voltage of the secondary battery; a first voltage sensor that detects a voltage value on a secondary side of the fuel cell converter; and a second voltage sensor that detects a voltage value on a secondary side of the secondary battery converter. The voltage boosting-disabling failure may include a failure of the first voltage sensor. When the voltage boosting-disabling failure is the failure of the first voltage sensor, the control unit may control the output electricity using a detection value of the second voltage sensor as the voltage value on the secondary side of the fuel cell converter. In this fuel cell system, when the voltage boosting-disabling failure is the failure of the first voltage sensor, the detection value of the second voltage sensor is used as the voltage value on the secondary side of the fuel cell converter. Thus, the output electricity of the fuel cell system can be continuously controlled.

(3) The above fuel cell system may further include: a first voltage sensor that detects a voltage value on a secondary side of the fuel cell converter; and a fuel cell voltage sensor that detects a voltage value of the fuel cell. The voltage boosting-disabling failure may include a failure of the first voltage sensor. When the voltage boosting-disabling failure is the failure of the first voltage sensor, the control unit may control the output electricity using a detection value of the fuel cell voltage sensor as the voltage value on the secondary side of the fuel well converter. In the fuel cell system of this aspect, when the voltage boosting-disabling failure is the failure of the first voltage sensor, the detection value of the fuel cell voltage sensor is used as the voltage value on the secondary side of the fuel cell converter. Thus, the output electricity of the fuel cell system can be continuously controlled.

(4) The above fuel cell system may further include: a secondary battery that supplies electricity to the load; a first current sensor that detects a current value of the fuel cell converter; and a second current sensor that detects a current value of the secondary battery. The voltage boosting-disabling failure may include a failure of the first current sensor. When the voltage boosting-disabling failure is the failure of the first current sensor, the control unit may estimate the current value of the fuel cell converter by using a detection value of the second current sensor and total electricity supplied by the fuel cell system, and control the output electricity rising the estimated current value as the current value of the fuel cell converter. In this fuel cell system, when the voltage boosting-disabling failure is the failure of the first current sensor, the current value of the fuel cell converter is estimated by using the detection value of the second current sensor and the total electricity supplied by the fuel cell system, and the estimated current value is used as the current value of the fuel cell converter. Thus, the output electricity of the fuel cell system can be continuously controlled.

A second aspect of the present disclosure relates to a control method of a fuel cell system having a fuel cell converter that is connected between fuel cell and a load and boosts an output voltage of the fuel cell. This control method includes, upon detecting a voltage boosting-disabling failure that is a failure in which the fuel cell converter is unable to perform a voltage boosting action and able to pass a current, stopping the voltage boosting action of the fuel cell converter and passing a current generated by the fuel cell through the fuel cell converter.

The present disclosure can also be implemented in various other forms than the fuel cell system. For example, the disclosure can be implemented in the form of a vehicle including the fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

A-1. Configuration of Fuel Cell System

Figure 1:
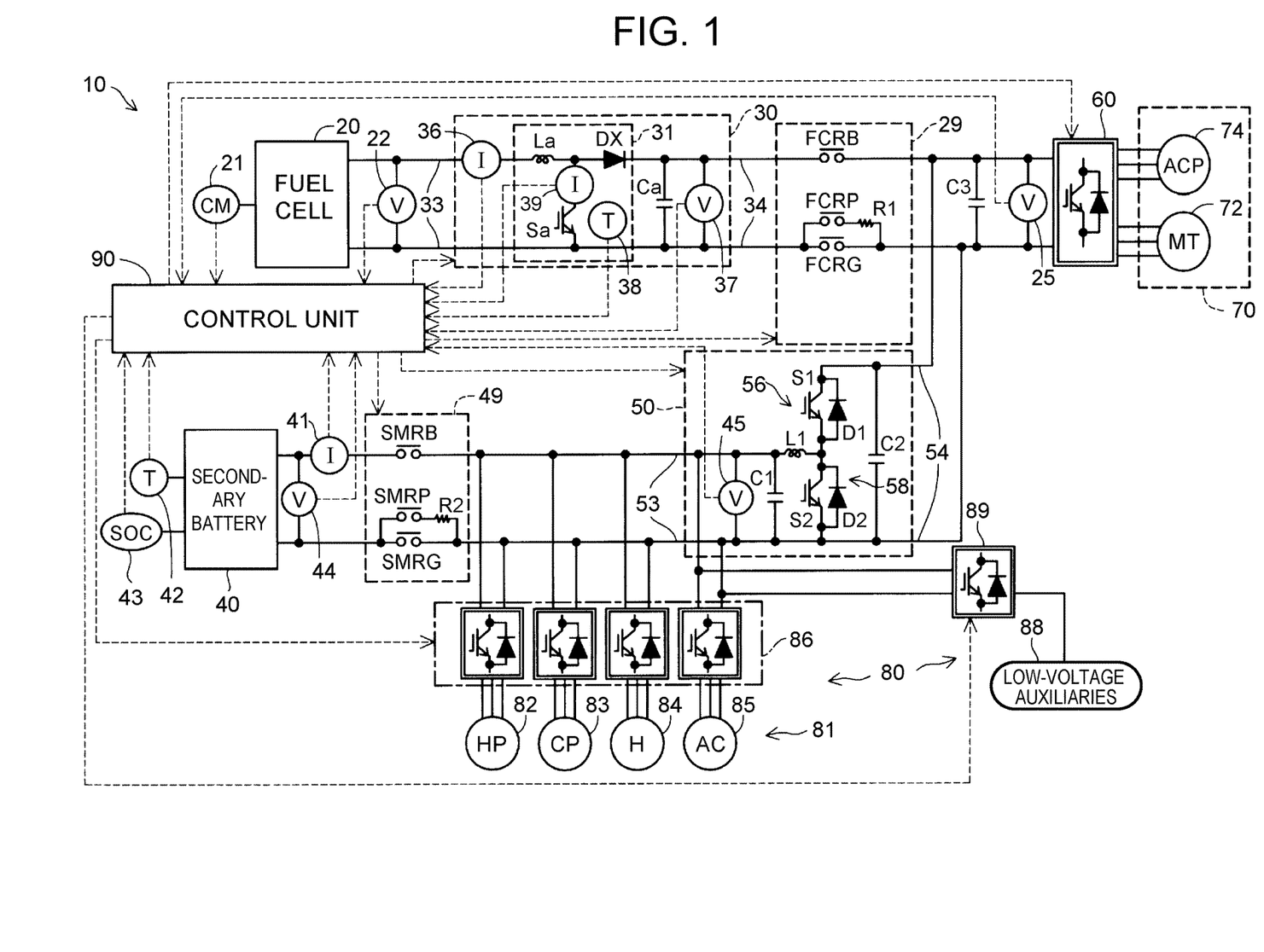
FIG. 1 is a schematic diagram showing an electric system of a fuel cell system.

FIG. 1 is a schematic diagram showing an electric system of a fuel cell system as an embodiment of the present disclosure. A fuel cell system 10 is installed in a fuel cell electric vehicle (not shown) as a system that supplies electricity for driving. The fuel cell system 10 supplies electricity to a load 70 to be described later. The load 70 includes a drive motor 72 and an air compressor 74.

The fuel cell system 10 includes a fuel cell 20, a fuel cell converter (hereinafter also referred to as an FDC) 30, a fuel cell relay circuit 29, a secondary battery 40, a secondary battery relay circuit 49, is secondary battery converter (hereinafter also referred to as a BDC) 50, an inverter 60, auxiliaries 80, and a control unit 90.

A source of electricity for the fuel cell system 10, the fuel cell 20 is a so-called polymer electrolyte fuel cell, and generates electricity by receiving a supply of a fuel gas and an oxidant gas. Instead of being a polymer electrolyte fuel cell, the fuel cell 20 may be another arbitrary type of fuel cell, such as a solid oxide fuel cell. The fuel cell 20 has a stack structure in which a plurality of single cells (not shown) is stacked.

A cell monitor 21 is connected to the fuel cell 20. The cell monitor 21 detects a cell voltage of each single cell of the fuel cell 20. The total value of the cell voltages is equivalent to the voltage of the fuel cell 20. The cell monitor 21 outputs detection values of the cell voltages and the voltage of the fuel cell 20 to the control unit 90. A third voltage sensor 22 is connected to an output terminal of the fuel cell 20. The third voltage sensor 22 detects the voltage of the fuel cell 20. In other words, the third voltage sensor 22 detects the voltage before being boosted by the FDC 30.

The FDC 30 boosts the output voltage of the fuel cell 20 in accordance with a command from the control unit 90. Specifically, the FDC 30 boosts the voltage supplied through a primary-side line 33 and supplies the boosted voltage to a secondary-side line 34. A primary side means a side to which electricity is supplied, i.e., an input side, and a secondary side means a side from which electricity is supplied, i.e. an output side. The boosted voltage is supplied to the inverter 60 through the fuel cell relay circuit 29. The FDC 30 adjusts the output electricity of the fuel cell 20 by adjusting a current passing through the FDC 30.

The FDC 30 is configured as a four-phase bridge converter. The FDC 30 has intelligent power modules (IPMs) 31 of four phases of a U-phase, V-phase, W-phase and X-phase, a first current sensor 36, a capacitor Ca, and a first voltage sensor 37. The IPMs 31 are connected in parallel to one another and have the same configuration. In FIG. 1, the IPM 31 of one of the four phases is shown as a representative.

Each IPM 31 is a circuit module incorporating a plurality of semiconductor elements, and has a reactor La, a backflow prevention diode DX, a switching, element Sa, a first temperature sensor 38, and a third current sensor 39. The reactor La is connected between a positive terminal of the fuel cell 20 and an anode terminal of the backflow prevention diode DX. The reactor La can store electricity and discharge stored electricity. The backflow prevention diode DX prevents backflow of a current from the secondary side of the FDC 30 toward the primary side. The switching element Sa is connected between a low potential-side line and a point of connection between the reactor La and the backflow prevention diode DX. The switching element Sa is an insulated gate bipolar transistor (IGBT). Instead of being an IGBT, the switching element Sa may be another arbitrary type of switching element, such as a bipolar transistor or an MOSFET. The first temperature sensor 38 detects the temperature of the IPM 31 and outputs the detection value to the control unit 90. The third current sensor 39 detects a current passing through the IPM 31 and outputs the detection value to the control unit 90.

The first current sensor 36 disposed on a high potential-side, and detects a current passing through the FDC 30 and outputs the detection value to the control unit 90. The capacitor Ca is disposed on the secondary side of the FDC 30. The first voltage sensor 37 detects a voltage value on the secondary side of the FDC 30, i.e., the value the voltage having been boosted by the FDC 30, and outputs the detection value to the control unit 90.

The fuel cell relay circuit 29 is disposed between the FDC 30 and the inverter 60. The fuel cell relay circuit 29 switches between electrically connecting and disconnecting the FDC 30 and the inverter 60 to and from each other in accordance with a command from the control unit 90. The fuel cell relay circuit 29 has an FC first relay FCRB, an FC second relay FCRG, an FC pre-charge relay FCRP, and a limiting resistor R1. The FC first relay FCRB is disposed on the high potential-side line. The FC second relay FCRG is disposed on the low potential-side line. The FC pre-charge relay FCRP is connected in parallel to the EC second relay FCRG. The limiting resistor R1 is connected in series with the FC pre-charge relay FCRP. The FC pre-charge relay FCRP and the limiting resistor R1 suppress contact welding of the FC second relay FCRG. The fuel cell relay circuit 29 may be disposed between the fuel cell 20 and the FDC 30.

The secondary battery 40 functions as a source of electricity for the fuel cell system 10 along with the fuel cell 20, and supplies electricity to the load 70 and the auxiliaries 80. In this embodiment, the secondary battery 40 is a chargeable and dischargeable lithium-ion battery. Instead of being a lithium-ion battery, the secondary battery 40 may be another arbitrary type of secondary battery, such as a nickel-metal hydride battery. The secondary battery 40 is connected in parallel to the fuel cell 20 relative to the load 70. The secondary battery 40 is charged with regenerated electricity generated by the drive motor 72.

A second current sensor 41 and a fourth voltage sensor 44 are electrically connected to an output terminal of the secondary battery 40. The second current sensor 41 detects a current value of the secondary battery 40 and outputs the detection value to the control unit 90. The fourth voltage sensor 44 detects an output voltage of the secondary battery 40 and outputs the detection value to the control unit 90. A second temperature sensor 42 and an SOC detection unit 43 are also connected to the secondary battery 40. The second temperature sensor 42 detects the temperature of the secondary battery 40 and outputs the detection value to the control unit 90. The SOC detection unit 43 detects the state of charge (SOC) indicating the amount of electricity stored in the secondary battery 40, and outputs the detection value to the control unit 90.

The secondary battery relay circuit 49 is disposed between the secondary battery 40 and the BDC 50. The secondary battery relay circuit 49 switches between electrically connecting and disconnecting the secondary battery 40 and the BDC 50 to and from each other in accordance with a command from the control unit 90. The secondary battery relay circuit 49 has a secondary battery first relay SMRB, a secondary battery second relay SMRG, a secondary battery pre-charge relay SMRP and a limiting resistor R2. The secondary battery first relay SMRB is disposed on a high potential-side line. The secondary battery second relay SMRG is disposed on a low potential-side line. The secondary battery pre-charge relay SMRP is connected in parallel to the secondary battery second relay SMRG. The limiting resistor R2 is connected in series with the secondary battery pre-charge relay SMRP. The secondary battery pre-charge relay SMRP and the limiting resistor R2 suppress contact welding of the secondary battery second relay SMRG.

The BDC 50 converts the output voltage of the secondary battery 40 in accordance with a command from the control unit 90. Specifically, the BDC 50 boosts a voltage supplied through a primary-side line 53 and supplies the boosted voltage to a secondary-side line 54. The boosted voltage is supplied to the inverter 60. The BDC 50 controls a portion of electricity of the fuel cell system 10 that is output from the secondary battery 40, by adjusting a current passing through the BDC 50. An output terminal of the BDC 50 and an output terminal of the FDC 30 are electrically connected to each other.

In this embodiment, the BDC 50 is a non-isolated DC-DC converter. The BDC 50 may instead be a bidirectional DC-DC converter that can step down a voltage input through the secondary-side line 54 and supply the stepped-down voltage to the secondary battery 40 through the primary-side line 53. The BDC 50 may constitute a power control unit (PCU) along with the inverter 60 and a step-down converter 89.

The BDC 50 has an upper arm 56, a lower arm 58, a reactor L1, capacitors C1, C2, and a fifth voltage sensor 45. The upper arm 56 includes a first switching element S1 and a first diode D1. The first switching element S1 is an IGBT. Instead of being an IGBT, the first switching element S1 may be another arbitrary type of switching element, such as a bipolar transistor or an MOSFET. The first diode D1 is connected in antiparallel to the first switching element S1. The lower arm 58 includes a second switching element S2 and a second diode D2, and has the same configuration as the upper arm 56. The upper arm 56 and the lower arm 58 are connected in series with each other. The reactor L1 is connected to a point of connection between the upper arm 56 and the lower arm 58. The capacitor C1 is disposed on the primary-side line 53, and the capacitor C2 is disposed on the secondary-side line 54. The fifth voltage sensor 45 is disposed on the primary-side line 53 and detects a voltage on the primary side of the BDC 50.

The inverter 60 converts direct-current electricity supplied from the fuel cell 20 and the secondary battery 40 into three-phase alternating-current electricity. The inverter 60 supplies the converted electricity to the load 70. A second voltage sensor 25 and a capacitor C3 are disposed at an input terminal of the inverter 60. The second voltage sensor 25 detects the value of a voltage input into the inverter 60, i.e., the value of the voltage on the secondary side of the BDC 50, and outputs the detection value to the control unit 90. The capacitor C3 suppresses fluctuations in the voltage input into the inverter 60.

The load 70 includes the drive motor 72 and the air compressor 74. The drive motor 72 drives wheels (not shown) of the fuel cell electric vehicle. The air compressor 74 pumps an oxidant gas to the fuel cell 20. Output torques of synchronous motors of the drive motor 72 and the air compressor 74 are controlled as the inverter 60 is controlled by the control unit 90. The drive motor 72 is not a component of the fuel cell system 10, but the air compressor 74 is a component of the fuel cell system 10. For the convenience of description, the load 70 in this embodiment will be described as not being a component of the fuel cell system 10.

The auxiliaries 80 are connected to the primary-side line 53 of the BDC 50. The auxiliaries 80 include high-voltage auxiliaries 81 that require high voltages to drive and low-voltage auxiliaries 88 that require low voltages to drive.

The high-voltage auxiliaries 81 include a hydrogen pump 82, a coolant pump 83, and a coolant heater 84. The hydrogen pump 82 returns an off-gas discharged from the fuel cell 20 back to a fuel gas supply passage. The coolant pump 83 circulates a coolant flowing inside the fuel cell 20. The coolant heater 84 beats the coolant such that water inside the fuel cell 20 does not freeze. The high-voltage auxiliaries 81 may include an air-conditioning device 85 of the filet cell electric vehicle etc. as a device that is not included in the fuel cell system 10. An auxiliary inverter 86 is connected to the high-voltage auxiliaries 81. The auxiliary inverter 86 converts direct-current electricity into three-phase alternating-current electricity and supplies the converted electricity to the high-voltage auxiliaries 81.

The low-voltage auxiliaries 88 include a flow control valve that is disposed in a flow passage through which a reactant gas and the coolant are supplied to or discharged from the fuel cell 20. The low-voltage auxiliaries 88 are supplied with electricity of which the voltage has been lowered by the step-down converter 89 to about 12 V.

The control unit 90 is a microcomputer including a central processing unit (CPU) and a storage device, and is configured as an electronic control unit (ECU). The CPU executes a program stored in advance in the storage device, and thereby executes control over an electricity generation operation of the fuel cell 20, a voltage boosting action of the FDC 30, a voltage boosting action of the BDC 50, output electricity to the load 70, and actions of the inverter 60, the auxiliary inverter 86, and the step-down converter 89. The output electricity to the load 70, i.e., the output electricity of the fuel cell system 10, is controlled as follows. The control unit 90 determines proportions of electricity to be supplied respectively from the fuel cell 20 and the secondary battery 40 relative to electricity required by the load 70, and determines a current and an output voltage of the FDC 30 and a current and an output voltage of the BDC 50. Then, the control unit 90 transmits a command ordering the FDC 30 and the BDC 50 to change the duty ratios of the switching elements Sa, S1, S2. Moreover, the control unit 90 detects a failure of the FDC 30 and controls the FDC 30 according to the type of the failure detected.

In the fuel cell system 10 of this embodiment, a failure-response control process to be described below is executed, and an operation mode of the fuel cell system 10 is thereby shifted to a mode in which the voltage boosting action of the FDC 30 is stopped and a current is passed through the FDC 30 (hereinafter referred to as a voltage boosting-less mode), according to the type of the failure of the FDC 30. Thus, electricity is continuously supplied from the fuel cell 20 to prevent shortening of the distance the fuel cell electric vehicle can travel.

A-2. Failure-Response Control Process

Figure 2:
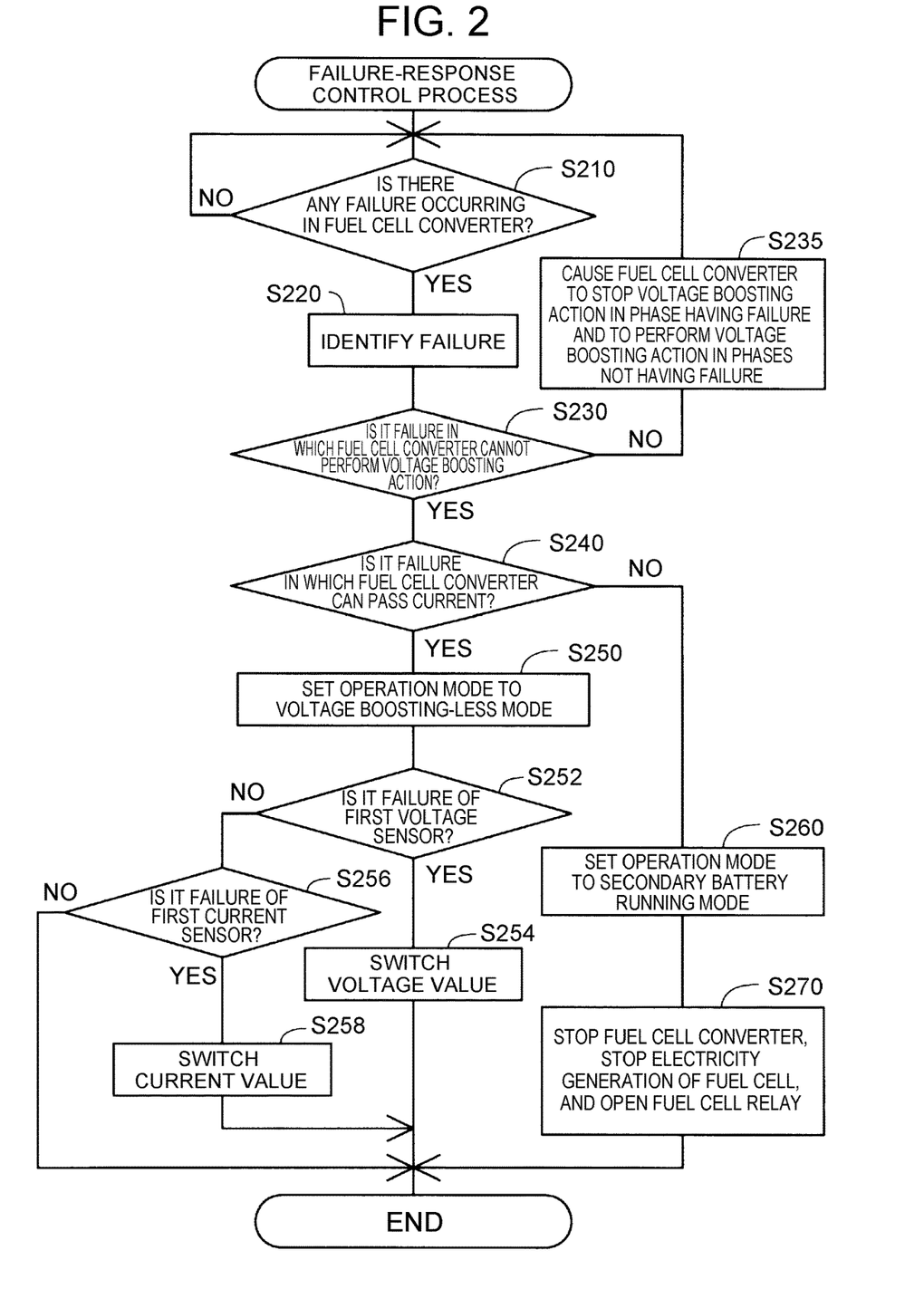
FIG. 2 is a flowchart showing the sequence of a failure-response control process.

FIG. 2 is a flowchart showing the sequence of the failure-response control process. The failure-response control process is executed after a starter switch (not shown) of the fuel cell electric vehicle is pressed and the fuel cell system 10 starts.

The control unit 90 determines whether there is any failure occurring in the FDC 30 (step S210).

Failures of the FDC 30 include the following (a) to (c):

(a) a failure in which the FDC 30 can perform the voltage booting action and can pass a current;

(b) a failure in which the FDC 30 cannot perform the voltage boosting action but can pass a current (hereinafter also referred to as a voltage boosting-disabling failure); and (c) a failure in which the FDC 30 can neither perform the voltage boosting action nor pass a current.

The failure of (a) means a failure in which the FDC 30 can perform the voltage boosting action. Examples of the failure of (a) include a failure of the IPM 31 of one or more of the four phases of the FDC 30. As the failure of the IPM 31, for example, a failure of the switching element Sa, a failure of the first temperature sensor 38, a failure of the third current sensor 39, and short-circuit and disconnection inside the circuit forming the IPM 31 are assumed.

The failure of (b) means a failure in which the FDC 30 cannot perform the voltage boosting action but electricity can be conducted between the primary-side line 33 and the secondary-side line 34 of the FDC 30. Examples of the failure of (b) include a failure of the first voltage sensor 37, a failure of the first current sensor 36, and failures of the first temperature sensors 38 of all the four phases.

The failure of (c) means a failure in which electricity cannot be conducted between the primary-side line 33 and the secondary-side line 34 of the FDC 30. Examples of the failure of (c) include a failure of the FDC 30 due to an overcurrent, overvoltage, circuit malfunction, etc.

Failures of the FDC 30 are detected by various methods. For example, short-circuit of the circuit forming the FDC 30 is detected when a voltage in a line reaches a voltage (e.g., 5 V) exceeding a predetermined valid value for the line (e.g., 0.1 V to 4.9 V). Similarly, disconnection of the circuit forming the FDC 30 is detected when a voltage in a line reaches a voltage (e.g., 0 V) lower than the valid value. For example, an overcurrent is detected when a current equal to or higher than a predetermined current value flows, and an overvoltage is detected when a voltage equal to or higher than a predetermined voltage value is applied. For example, failures of sensors are detected by comparing detection values of different sensors by a so-called two value comparison, or comparing a detection value and an estimation value. Failures of sensors may be comprehensively detected by combining a plurality of two-value comparisons, estimation value comparisons, etc.

For example, a comparison between a detection value of the first voltage sensor 37 and a detection value of the second voltage sensor 25 is used to detect a failure of the first voltage sensor 37. The detection values of the first voltage sensor 37 and the second voltage sensor 25 are theoretically equal. In this embodiment, therefore, a failure of the first voltage sensor 37 is detected when the difference between the detection values of the first voltage sensor 37 and the second voltage sensor 25 falls outside a range of error.

For example, a comparison between a detection value of the first current sensor 36 and the sum of detection values of the third current sensors 39 is used to detect a failure of the first current sensor 36. The detection value of the first current sensor 36 and the sum of the current values of the IPMs 31 detected by the third current sensors 39 of the respective IPMs 31 are theoretically equal. In this embodiment, therefore, a failure of the first current sensor 36 is detected when the difference between the detection value of the first current sensor 36 and the sum of the detection values of the third current sensors 39 falls outside a range of error.

For example, a comparison among detection values of the third current sensors 39 of the phases is used to detect a failure of the third current sensor 39 of each phase. In this embodiment, a failure of the third current sensor 39 of one phase is detected when the difference between the detection value of the third current sensor 39 of that one phase and the detection values of the third current sensors 39 of the other three phases falls outside a range of error.

For example, a comparison between an estimation value and a detection value of a temperature rise is used to detect a failure of the first temperature sensor 38 of each phase. In this embodiment, a failure of the first temperature sensor 38 is detected, when a temperature rise per unit time is calculated from a detection value of the first temperature sensor 38 and the difference between this calculated temperature rise and a temperature rise per unit time estimated from an electricity loss due to heat generation accompanying the voltage boosting action falls outside a range of error.

When it is determined in step S210 that there is no failure occurring in the FDC 30 (step S210: NO), the control unit 90 returns to step S210.

On the other hand, when it is determined in step S210 that there is a failure occurring in the FDC 30 (step S210: YES), the control unit 90 identifies the failure that is occurring (step S220).

The control unit 90 determines whether the identified failure of the FDC 30 is a failure in which the FDC 30 cannot perform the voltage boosting action (step S230). In other words, the control unit 90 determines whether the failure of the FDC 30 is the failure of (b) or the failure of (c).

When it is determined in step S230 that the failure is not a failure in which the FDC 30 cannot perform the voltage boosting action, i.e., the failure is the failure of (a) (step S230: NO), the control unit 90 causes the FDC 30 to stop the voltage boosting action in the phase having the failure and to perform the voltage boosting action only in the phases not having a failure (step S235). For example, when the IPM 31 of one phase among the IPMs 31 of the four phases fails, the control unit 90 causes the FDC 30 to stop the voltage boosting action by fixing the duty ratio of the switching element Sa of the phase having the failure at zero, and to perform the voltage boosting action in the other three phases not having a failure. The output is lower when the voltage boosting action is performed using the IPMs 31 of three phases than when the voltage boosting action is performed using the IPMs 31 of all the four phases.

Since the voltage boosting action of the FDC 30 is stopped in the phase having the failure and performed only in the phases not having a failure in step S235, electricity can be continuously supplied from the fuel cell 20 to the load 70. After step S235, the control unit 90 returns to step S210. The control unit 90 may notify a user of the fuel cell electric vehicle of the failure of the FDC 30 and prompt the user to bring the vehicle to a service shop etc.

On the other hand, when it is determined in step S230 that the failure is a failure in which the FDC 30 cannot perform the voltage boosting action (step S230: YES), the control unit 90 determines whether the failure of the FDC 30 is a failure in which the FDC 30 can pass a current (step S240). In other words, the control unit 90 determines whether the failure of the FDC 30 is the failure of (b), of the failure of (b) and the failure of (c).

When it is determined in step S240 that the failure is not a failure in which the FDC 30 can pass a current, i.e., the failure is a failure in which the FDC 30 cannot pass a current as in the failure of (e) (step S240: NO), no current can be passed through the FDC 30. Therefore, the control unit 90 sets the operation mode of the fuel cell system 10 to a secondary battery running mode (step S260).

In the secondary battery running mode, electricity is supplied using only the secondary battery 40. The control unit 90 stops the FDC 30, stops electricity generation of the fuel cell 20, and opens the fuel cell relay circuit 29 (step S270). Stopping the FDC 30 means directly connecting the primary-side line 33 and the secondary-side line 34 to each other without the FDC 30 performing the voltage boosting action. Specifically, the duty ratios of the switching elements Sa of the IPMs 31 of all the four phases are fixed at zero. Stopping electricity generation of the fuel cell 20 means stopping the supply of a fuel gas and an oxidant gas to the fuel cell 20. After step S270, the failure-response control process is ended.

On the other hand, when it is determined in step S240 that the failure is a failure in which the FDC 30 can pass a current (step S240: YES), the control unit 90 sets the operation mode of the fuel cell system 10 to the voltage boosting-less mode (step S250). Specifically, upon detecting the voltage boosting-disabling failure that is a failure in which the FDC 30 cannot perform the voltage boosting action but can pass a current, the control unit 90 stops the voltage boosting action of the FDC 30 and passes a current through the FDC 30.

In the voltage boosting-less mode, the voltage boosting action of the FDC 30 is stopped and the primary-side line 33 and the secondary-side line 34 are directly connected to each other to pass a current through the FDC 30. Thus, the FDC 30 functions merely as a circuit to pass a current. The voltage supplied from the fuel cell 20 is output to the inverter 60 without undergoing the voltage boosting action by the FDC 30.

When a failure of the first voltage sensor 37, a failure of the first current sensor 36, failures of the first temperature sensors 38 of all the four phases, or the like occurs, continuing the voltage boosting action of the FDC 30 may result in a significant difference between the actual output and the required output. By comparison, passing a current through the FDC 30 is less likely to cause significant fluctuations in the output electricity.

As has been described above, the output electricity of the fuel cell system 10 is controlled through determination of the current and the output voltage of the FDC 30 and the current and the output voltage of the BDC 50. Thus, controlling the output electricity requires the output voltage of the FDC 30 and the current value of the FDC 30. As mentioned above, the output voltage of the FDC 30 is detected by the first voltage sensor 37. Therefore, when the first voltage sensor 37 has failed, it is desirable to obtain the output voltage of the FDC 30 by another method. The current value of the FDC 30 is detected by the first current sensor 36. Therefore, when the first current sensor 36 has failed, it is desirable to obtain the current value of the FDC 30 by another method.

The control unit 90 determines whether the failure of the FDC 30 is a failure of the first voltage sensor 37 (step S252). When it is determined that the failure of the FDC 30 is a failure of the first voltage sensor 37 (step S252: YES), the control unit 90 switches the output voltage value of the FDC 30 to be used for controlling the output electricity (step S254).

In step S254, the voltage value to be used as the output voltage value of the FDC 30 is switched from the voltage value detected by the first voltage sensor 37 to the voltage value detected by the second voltage sensor 25. This measure takes advantage of the fact that the output voltage value of the FDC 30 detected by the first voltage sensor 37 and the voltage value detected by the second voltage sensor 25 are theoretically equal.

After step S254, the failure-response control process is ended. The control unit 90 controls the output electricity of the fuel cell system 10 by using the voltage value having been switched in step S254.

On the other hand, when it is determined in step S252 that the failure of the FDC 30 is not a failure of the first voltage sensor 37 (step S252: NO), the control unit 90 determines whether the failure of the FDC 30 is a failure of the first current sensor 36 (step S256). When it is determined that the failure of the FDC 30 is not a failure of the first current sensor 36 (step S256: NO), the failure-response control process is ended. On the other hand, when it is determined that the failure of the FDC 30 is a failure of the first current sensor 36 (step S256: YES), the control unit 90 switches the current value of the FDC 30 to be used for controlling the output electricity (step S258).

In step S258, the control unit 90 estimates the current value of the FDC 30 by using the total electricity supplied by the fuel cell system 10 and the current value of the secondary battery 40 detected by the second current sensor 41. Then, the control unit 90 switches the current value to be used as the current value of the FDC 30 from the detection value of the first current sensor 36 to this estimation value.

The total electricity supplied by the fuel cell system 10 is equal to the sum of electricity consumed by the load 70 and electricity consumed by the auxiliaries 80. The electricity consumed by the load 70 including the drive motor 72 and the air compressor 74 can be calculated, for example, from a current value detected by a current sensor (not shown) disposed at the inverter 60 and a voltage input into the inverter 60. Of the electricity consumed by the auxiliaries 80, electricity consumed by the high-voltage auxiliaries 81 can be calculated, for example, from a current value detected by a current sensor (not shown) disposed at the auxiliary inverter 86 and a voltage detected by the fifth voltage sensor 45. Of the electricity consumed by the auxiliaries 80, electricity consumed by the low-voltage auxiliaries 88 accounts for a small proportion of the entire consumed electricity, and therefore may be regarded as a constant. For example, the current flowing through the low-voltage auxiliaries 88 may be assumed to be 100 A, and the electricity consumed by the low-voltage auxiliaries 88 may be regarded as 1.2 kW from the voltage value of 12 V to which the voltage has been stepped down by the step-down converter 89.

The total electricity supplied by the fuel cell system 10 comes from electricity supplied from the fuel cell 20 and the secondary battery 40. It is therefore possible to estimate the electricity supplied from the fuel cell 20 and estimate the current value of the FDC 30, by obtaining the electricity supplied from the secondary battery 40 based on the current value of the secondary battery 40 detected by the second current sensor 41 and on the voltage value of the secondary battery 40 detected by the fourth voltage sensor 44, and then subtracting this electricity from the total electricity supplied by the fuel cell system 10. When the SOC is equal to or higher than a predetermined value, the voltage value of the secondary battery 40 may be a fixed value instead of the value detected by the fourth voltage sensor 44.

After step S258, the failure-response control process is evaded. The control unit 90 controls the output electricity of the fuel cell system 10 by using the current value estimated in step S258. After the failure-response control process is ended, the control unit 90 may notify the user of the fuel cell electric vehicle of the failure of the FDC 30 and prompt the user to bring the vehicle to a service shop etc.

In the fuel cell system 10 of the embodiment having been described above, when the FDC 30 has failed during travel of the fuel cell electric vehicle and this failure is the voltage boosting-disabling failure in which the FDC 30 cannot perform the voltage boosting action but can pass a current, the voltage boosting action of the FDC 30 is stopped and a current is passed through the FDC 30. Thus, electricity can be continuously supplied from the fuel cell 20 to the load 70, so that shortening of the distance that the fuel cell electric vehicle can travel can be prevented compared with if electricity is supplied only from the secondary battery 40.

When the voltage boosting-disabling failure is a failure of the first voltage sensor 37, the detection value of the second voltage sensor 25 is used as the voltage value on the secondary side of the FDC 30. Thus, the output electricity of the fuel cell system 10 can be controlled. The detection value of the second voltage sensor 25 that is theoretically equal to the detection value of the first voltage sensor 37 is used as the voltage value on the secondary side of the FDC 30. Therefore, an error from the actual voltage value can be avoided.

When the voltage boosting-disabling, failure is a failure of the first current sensor 36, the current value of the FDC 30 is estimated by using the detection value of the second current sensor 41 and the total electricity supplied by the fuel cell system 10, and the estimated current value is used as the current value of the FDC 30. Thus, the output electricity of the fuel cell system 10 can be continuously controlled. Moreover, compared with if the current value of the FDC 30 is estimated by using an I-V curve that indicates I-V characteristics of the fuel cell 20, the influence of fluctuations in the I-V curve due to deterioration etc. of the fuel cell 20 can be avoided, and thus an error from the actual current value can be avoided.

In the voltage boosting-less mode, electricity can be continuously supplied not only from the fuel cell 20 but also from the secondary battery 40. Thus, when the voltage required by the load 70 is higher than the voltage on the secondary side of the FDC 30, a voltage corresponding to the shortage can be supplied from the secondary battery 40. Therefore, the supply voltage can be prevented from falling short of the voltage required by the load 70.

In the case of a failure in which the FDC 30 can perform the voltage boosting action, the FDC 30 performs the voltage boosting action by using the IPMs 31 of phases that are not having a failure. Thus, electricity can be continuously supplied from the fuel cell 20 to the load 70 to prevent shortening of the distance that the fuel cell electric vehicle can travel.

B. Other Embodiments

B-1. Second Embodiment

In the failure-response control process of the above embodiment, the voltage value to be used as the output voltage value of the FDC 30 is switched to the voltage value detected by the second voltage sensor 25 in step S254. However, the present disclosure is not limited to this example. For example, the voltage value to be used as the output voltage value of the FDC 30 may be switched to the voltage value detected by the third voltage sensor 22 instead of the voltage value detected by the second voltage sensor 25. This measure takes advantage of the fact that the voltage on the primary side and the voltage on the secondary side of the FDC 30 become theoretically equal when the voltage boosting action of the FDC 30 is stopped. In this aspect, the third voltage sensor 22 can be regarded as a subordinate concept of the fuel cell voltage sensor mentioned in the SUMMARY. In another aspect, for example, the voltage value to be used as the output voltage value of the FDC 30 may be switched to a value obtained by adding up the values of the cell voltages of the respective single cells of the fuel cell 20 detected by the cell monitor 21. In this aspect, the cell monitor 21 can be regarded as a subordinate concept of the fuel cell voltage sensor mentioned in the SUMMARY. For example, in these aspects in which the voltage value is switched as described above, a value corrected based on a difference of sensors between the first voltage sensor 37 on one hand and the second voltage sensor 25, the third voltage sensor 22, and the cell monitor 21 on the other hand, may be used as the output voltage value of the FDC 30. For example, the output voltage value of the FDC 30 may be estimated based on the current value of the FDC 30 and the I-V curve indicating the I-V characteristics of the fuel cell 20 that is stored in advance in the storage device of the control unit 90, and the voltage value to be used as the output voltage value of the FDC 30 may be switched to this estimation value. These configurations can achieve effects similar to those of the above embodiment.

B-2. Third Embodiment

In the failure-response control process of the above embodiment, the current value of the FDC 30 is estimated by using the total electricity supplied by the fuel cell system 10 and the current value of the secondary battery 40 detected by the second current sensor 41 in step S258. However, the present disclosure is not limited to this example. For example, the current value of the FDC 30 may be estimated from the sum of the detection values of the third current sensors 39 of the IPMs 31. Alternatively, for example, the current value of the FDC 30 may be estimated based on the output voltage value of the FDC 30 and the I-V curve indicating the I-V characteristics of the fuel cell 20 that is stored in advance in the storage device of the control unit 90. These configurations can achieve effects similar to those of the above embodiment.

B-3. Fourth Embodiment

The contents of the control in the voltage boosting-less mode in the above embodiment is merely an example and can be modified in various ways. For example, in the voltage boosting-less mode, the upper arm 56 of the BDC 50 may be turned on and the lower arm 58 of the BDC 50 may be turned off, to thereby stop the voltage boosting action of the BDC 50 and directly connect the primary-side line 53 and the secondary-side line 54 to each other. In this configuration, electricity to be consumed in the load 70 is supplied preferentially from one of the fuel cell 20 and the secondary battery 40 that has a higher voltage, and electricity is supplied from both the fuel cell 20 and the secondary battery 40 from a point when the voltage of the fuel cell 20 and the voltage of the secondary battery 40 become equal. By thus stopping the voltage boosting action of the BDC 50, it is possible to avoid a situation where the output voltage of the BDC 50 becomes higher than the output voltage of the FDC 30 and electricity is supplied only from the secondary battery 40. Thus, over-discharge of the secondary battery 40 can be avoided. Moreover, an amount of electricity equal to or larger than a rated amount of dischargeable electricity of the secondary battery 40 can be prevented from being supplied from the secondary battery 40, so that deterioration of the secondary battery 40 can be avoided.

In the voltage boosting-less mode, stopping the voltage boosting action of the FDC 30 makes it difficult to control the amount of electricity generated by the fuel cell 20. Therefore, for example, an extra amount of fuel gas may be supplied to the fuel cell 20 and thus the amount of electricity generated may be increased compared with under normal control when the FDC 30 is having no failure, in order to obtain electricity required by the load 70. When extra electricity equal to or higher than required electricity is generated by such electricity generation, the upper arm of the BDC 50 may be turned on to charge the secondary battery 40.

For example, in the voltage boosting-less mode, the voltage of the fuel cell 20 may be maintained at a higher value than the voltage of the secondary battery 40. More specifically, the cell voltage may be maintained at a higher potential and the SOC of the secondary battery 40 may be lowered to lower the voltage of the secondary battery compared with under normal control when the FOG 30 is having no failure. The SOC of the secondary battery 40 can be lowered by adjusting the timing at which the upper arm 56 of the BDC 50 is turned on. When the voltage of the fuel cell 20 is maintained at a higher value than the voltage of the secondary battery 40, electricity can be supplied preferentially from the fuel cell 20 to the load 70. Thus, it is possible to continue the electricity generation operation of the fuel cell 20 while avoiding a situation where electricity is supplied preferentially from the secondary battery 40 to the load 70 and the fuel cell 20 generates extra electricity. Since the voltage on the primary side of the BDC 50 is lower than the voltage on the secondary side of the FDC 30, a margin of voltage boosting by the BDC 50 can be secured. To avoid making the voltage boosting action unstable, such a margin of voltage boosting is secured that the voltage on the primary side of the BDC 50 may be boosted to a value equal to the voltage on the secondary side of the FDC 30 at a voltage boosting ratio equal to or higher than a predetermined minimum voltage boosting ratio. Thus, it is possible to avoid a situation where the voltage boosting action of the BDC 50 becomes unstable and the accuracy of voltage boosting decreases, as well as a situation where the voltage boosting action of the BDC 50 stops and a current passing through the BDC 50 cannot be controlled.

As electricity to be supplied to the auxiliaries 80 in the voltage boosting-less mode, for example, the electricity supplied from the fuel cell 20 as the upper arm of the BDC 50 is turned on may also be used in addition to the electricity supplied from the secondary battery 40. For example, to reduce electricity supplied by the fuel cell system 10, the electricity supplied to the auxiliaries 80 may be minimized. For example, the coolant heater 84, the air-conditioning device 85, etc. may be stopped. These configurations can achieve effects similar to the above embodiment.

B-4. Fifth Embodiment

The failure-response control process in the above embodiment is merely an example and can be modified in various ways. For example when it is determined in step S230 that the failure is not a failure in which the FDC 30 cannot perform the voltage boosting action (step S230: NO), the control unit 90 may move to step S250 and shifts the operation mode to the voltage boosting-less mode. For example, in step S270, at least one of the contents of the control in the secondary battery running mode, i.e., stopping the FDC 30, stopping electricity generation of the fuel cell 20, and opening the fuel cell relay circuit 29, may be omitted. These configurations can achieve effects similar to those of the above embodiment.

B-5. Sixth Embodiment

In the above embodiment, the FDC 30 is configured as a four-phase bridge converter, but the present disclosure is not limited to this example. The number of phases of the FDC 30 may be one, two, three, or five or larger, instead of four. These configurations can achieve effects similar to those of the above embodiment.

B-6. Seventh Embodiment

In the above embodiment, the fuel cell system 10 has been described as including the secondary battery 40 and the BDC 50, but the present disclosure is not limited to this example. The secondary battery 40 and the BDC 50 may not be components of the fuel cell system 10, and may be able to supply electricity to the load 70 by being connected to the load 70, separately from the fuel cell system 10. In the above embodiment, the FDC 30 has been described as having the first voltage sensor 37 and the first current sensor 36, but the present disclosure is not limited to this example. The first voltage sensor 37 and the first current sensor 36 may not be components of the FDC 30, and may be electrically connected to the FDC 30 so as to be able to detect the voltage value on the secondary side of the FDC 30 and the current value of the FDC 30, respectively. These configurations can achieve effects similar to those of the above embodiment.

B-7. Eighth Embodiment

The control unit 90 of the above embodiment is a single ECU but may instead be composed of a plurality of ECUs. When the control unit 90 is composed of a plurality of ECUs, control over electricity generation of the fuel cell 20, control over the voltage boosting actions of the FDC 30 and the BDC 50, etc. may be performed by different ECUs. The control unit 90 may be formed as a part of a unit that controls the fuel cell electric vehicle. These configurations can achieve effects similar to those of the above embodiment.

B-8. Ninth Embodiment

In the above embodiment, the fuel cell system 10 is used by being installed in the fuel cell electric vehicle. However, the fuel cell system 10 may be installed in another arbitrary mobile object, such as a ship or a robot, instead of a vehicle. These configurations can achieve effects similar to those of the above embodiment.

The present disclosure is not limited to the above embodiments but can be implemented in various configurations without departing from the gist of the disclosure. For example, the technical features of the embodiments corresponding to the technical features of the aspects described in the SUMMARY can be replaced or combined as appropriate in order to solve some or all of the above problems or to achieve some or all of the above effects. Unless a technical feature is described as being essential in the specification, the technical feature can be omitted as appropriate.

What is claimed is:

1. A fuel cell system comprising:
   a fuel cell that supplies electricity to a load;
   a fuel cell converter that is connected between the fuel cell and the load and boosts a voltage output from the fuel cell; and
   a control unit programmed to cause the fuel cell converter to perform a voltage boosting action, and programmed to control output electricity to the load, the control unit is programmed to, upon detecting a voltage boosting-disabling failure that is a failure in which the fuel cell converter is unable to perform the voltage boosting action and able to pass a current, stop the voltage boosting action of the fuel cell converter and pass a current generated by the fuel cell through the fuel cell converter.

2. The fuel cell system according to claim 1, further comprising:
   a secondary battery that supplies electricity to the load;
   a secondary battery converter that is connected between the secondary battery and the load, has an output terminal electrically connected to an output terminal of the fuel cell converter, and converts an output voltage of the secondary battery;
   a first voltage sensor that detects a voltage value on a secondary side of the fuel cell converter; and
   a second voltage sensor that detects a voltage value on a secondary side of the secondary battery converter,
   wherein the voltage boosting-disabling failure includes a failure of the first voltage sensor, and
   the control unit is programmed to, when the voltage boosting-disabling failure is the failure of the first voltage sensor, control the output electricity using a detection value of the second voltage sensor as the voltage value on the secondary side of the fuel cell converter.

3. The fuel cell system according to claim 1, further comprising:
   a first voltage sensor that detects a voltage value on a secondary side of the fuel cell converter; and
   a fuel cell voltage sensor that detects a voltage value of the fuel cell,
   wherein the voltage boosting-disabling failure includes a failure of the first voltage sensor, and
   the control unit is programmed to, when the voltage boosting-disabling failure is the failure of the first voltage sensor, control the output electricity using a detection value of the fuel cell voltage sensor as the voltage value on the secondary side of the fuel cell converter.

4. The fuel cell system according to claim 1, further comprising:
   a secondary battery that supplies electricity to the load;
   a first current sensor that detects a current value of the fuel cell converter; and
   a second current sensor that detects a current value of the secondary battery,
   wherein the voltage boosting-disabling failure includes a failure of the first current sensor, and
   the control unit is programmed to, when the voltage boosting-disabling failure is the failure of the first current sensor, estimate the current value of the fuel cell converter by using a detection value of the second current sensor and total electricity supplied by the fuel cell system, and control the output electricity using the estimated current value as the current value of the fuel cell converter.

5. A control method of a fuel cell system having a fuel cell converter that is connected between a fuel cell and a load and boosts an output voltage of the fuel cell and a control unit programmed to execute the control method, the control method comprising, upon detecting a voltage boosting-disabling failure that is a failure in which the fuel cell converter is unable to perform a voltage boosting action and able to pass a current, stopping the voltage boosting action of the fuel cell converter and passing a current generated by the fuel cell through the fuel cell converter.

* * * * *